No. 694,017. Patented Feb. 25, 1902.
E. HOUSTON.
APPARATUS FOR SEPARATING SILK FROM GREEN CORN.
(Application filed Mar. 18, 1901.)
(No Model.) 2 Sheets—Sheet 1.
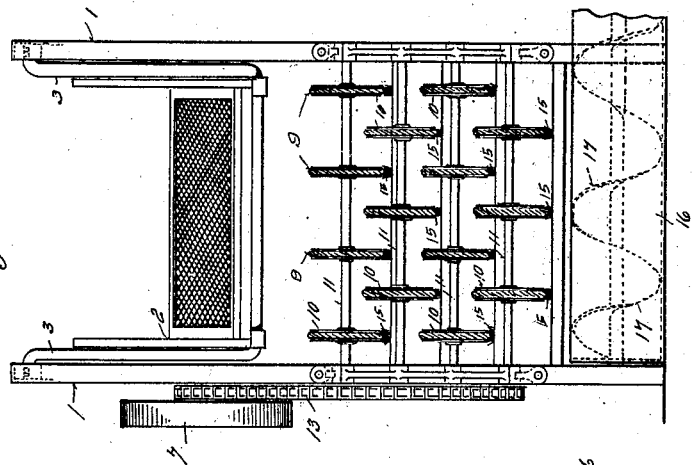
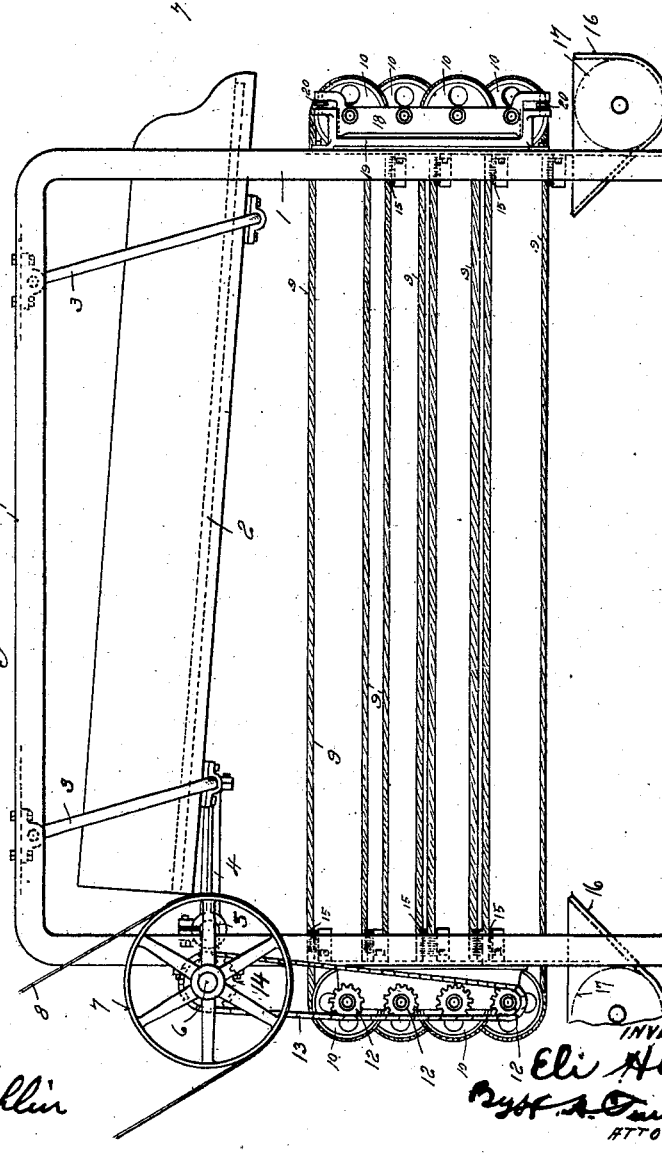

No. 694,017. Patented Feb. 25, 1902.
E. HOUSTON.
APPARATUS FOR SEPARATING SILK FROM GREEN CORN.
(Application filed Mar. 18, 1901.)
(No Model.) 2 Sheets—Sheet 2.
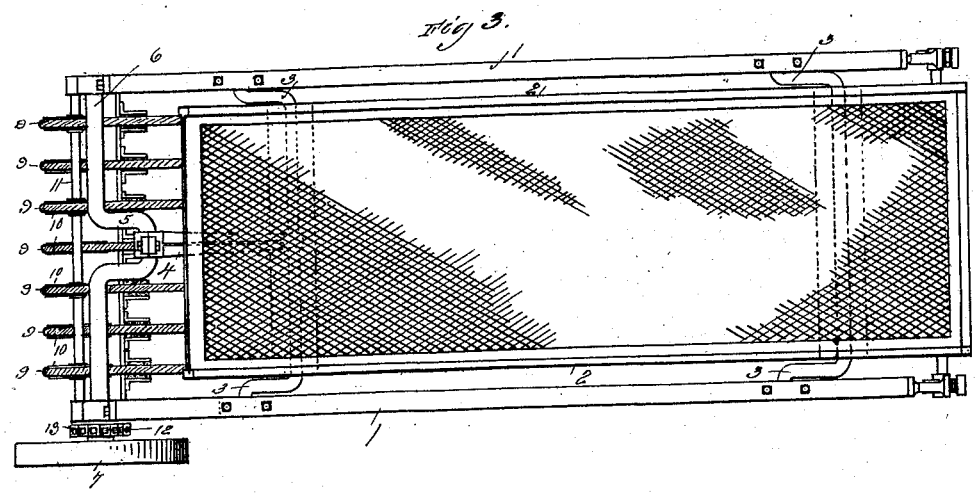
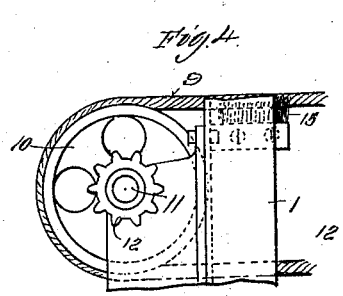 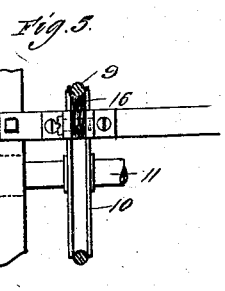 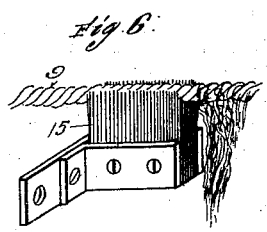
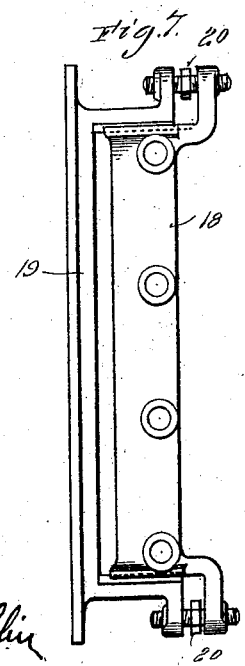 
WITNESSES: INVENTOR
Eli Houston
By H. A. Toulmin,
ATTORNEY.

UNITED STATES PATENT OFFICE.

ELI HOUSTON, OF MORROW, OHIO, ASSIGNOR OF ONE-HALF TO WILLIAM B. HAYNER, OF SOUTH LEBANON, OHIO.

APPARATUS FOR SEPARATING SILK FROM GREEN CORN.

SPECIFICATION forming part of Letters Patent No. 694,017, dated February 25, 1902.

Application filed March 18, 1901. Serial No. 51,607. (No model.)

*To all whom it may concern:*

Be it known that I, ELI HOUSTON, a citizen of the United States, residing at Morrow, in the county of Warren and State of Ohio, have invented certain new and useful Improvements in Apparatus for Separating Silk from Green Corn, of which the following is a specification, reference being had therein to the accompanying drawings.

This invention relates to apparatus for separating silk from green corn, and is more particularly devised for use in connection with canneries for the purpose of separating the silk from the grains of corn after these latter have been cut from the cob.

The object of my invention is to provide an apparatus which shall be both simple and effective and capable of continuous operation, being practically self-cleaning.

To these ends the invention consists in certain novel features which I will now proceed to describe, and particularly point out in the claims.

In the accompanying drawings, Figure 1 is a side elevation of an apparatus embodying my invention in one form. Fig. 2 is an end elevation of the same. Fig. 3 is a plan view. Fig. 4 is an enlarged detail view of a portion of the apparatus in side elevation. Fig. 5 is an end view of what is shown in Fig. 4. Fig. 6 is a detail perspective view, and Figs. 7 and 8 are detail views of a tensioning device.

In cleaning corn the green corn as it is cut from the ear is mixed with more or less silk, and the entire mass being moist it is difficult to separate the grains of corn from the silk, one of the chief difficulties being that a portion of the corn, comprising the smaller and more valuable parts thereof, is separated out along with the silk, and thus lost.

Various forms of apparatus have been devised for the purpose of effecting a rapid and complete separation of the corn and silk; but, so far as I am aware, these contemplated constructions have been ineffectual in separating the smaller corn from the silk. Such earlier devices, so far as I am aware, have been built on the "comb" principle and involve the use of pins or projections around which the silk becomes entangled, making the operation of clearing them a difficult one, generally involving stoppage of the machine. To overcome these objections, I have devised the apparatus shown in the accompanying drawings, which in its preferred form comprises a frame 1, in which is mounted a vibrating screen 2, suspended by links 3 and actuated by a pitman 4 from a crank 5 on a shaft 6, provided with a pulley 7 and belt 8 or any other suitable means for imparting motion to said shaft. This screen is employed for separating the particles of cob and husk from the corn after it has been cut from the cob, the cut corn being dropped onto the sieve, which retains the portions of cob, husk, and other large impurities and discharges them at the end of the sieve. The grains of corn and the silk pass through the screen and are subsequently treated for the separation of the grains and the silk.

My improved separating device comprises a plurality of endless ropes or cables 9, which are located so as to travel horizontally, or approximately so, along the space beneath the screen 2. In the present instance I have shown these ropes as arranged in four groups of four and three cables each, the groups being arranged below each other successively and the cables of one group being located vertically between the cables of the adjacent groups. These ropes pass around wheels 10, mounted on shafts 11 at each end of the machine, there being two shafts, one at each end, for each group. Motion may be imparted to the ropes in any suitable manner, and I have shown for this purpose the shafts 11 at one end of the machine as provided with sprocket-wheels 12, which are engaged by a sprocket-chain 13, driven by a sprocket-wheel 14 on the shaft 6. Motion being thus imparted to the several ropes, the corn and silk which are discharged into the space occupied by the ropes will in their fall come into contact with one or more of the ropes. The silk being fibrous, long, and flexible will become entwined around the particular rope with which it comes into contact and will be carried off laterally thereby, while the grains of corn will be unable to cling to the ropes, owing to their rounded surfaces and the vibratory motion, which is an incident of their longitudinal motion. It will thus be seen that the silk will not be able to pass through all of the ropes, but will be engaged by the upper or lower portion of one or the other of the ropes and carried off either to one side or the other of the machine, while the grains of corn will pass down through all of the ropes and will be delivered free from silk below the separator formed by the entire series of ropes. Moreover, the nature of the structure is such that the smaller and more valuable grains or portions of grains of corn are effectually separated from the silk. It will be understood, of course, that the cleaned corn is discharged into any suitable receptacle beneath the ropes.

The silk is removed from the ropes by means of cleaning devices or scrapers 15, which may be in the form of brushes, as indicated more particularly in Fig. 6 of the drawings. It will be understood, of course, that one of these brushes will be employed at each end of each rope, one being used to clean the discharge end of the upper part of the rope and the other to clean the discharge end of the lower part of the rope. A suitable trough 16, provided with a conveyer 17, is employed underneath each end of the separator to receive the silk and discharge it from the machine.

It will thus be seen that the machine is practically automatic in clearing itself of the silk as this latter accumulates and that it may, therefore, be used continuously without stoppages for the purpose of removing the accumulated silk from the separator.

The shafts 11 at one end of the machine are mounted in yokes 18, adapted to slide in brackets 19, carried by the frame 1, and adjustable by means of right and left screws 20, so as to keep the ropes at a proper tension. While I have described the parts 9 as "ropes" or "cables" and prefer to employ such ropes or cables for the reason that their round configuration prevents adhesion of the grains of corn, while the roughness of their surface, due to their fibrous or filamental structure, causes the silk to engage with them, yet it is obvious that other flexible endless traveling devices of a similar nature having a conformation such as to adapt them to engage the silk, while they are sufficiently narrow to prevent the lodging of the grains of corn thereon, may be employed instead of ropes. It is also obvious that the number of these devices and their particular arrangement may be varied, always providing that a sufficient number are employed to intercept the silk as it falls and prevent its escape along with the grains of corn. It is therefore obvious that I do not limit myself to the precise details of construction hereinbefore described, and shown in the accompanying drawings.

Having thus fully described my invention, what I claim as new, and desire to secure by Letters Patent, is—

1. As a means for effecting the separation of the silk from the grains of cut green corn, a plurality of endless flexible traveling ropes or the like arranged in groups in different horizontal planes, and the ropes of each group being offset or staggered relatively to the ropes of the groups above and below, whereby, the silk and corn passing by gravity through the ropes, the silk will engage with and be carried off by the ropes, while the corn will be discharged from the ropes and pass downward through the same, substantially as described.

2. An apparatus for separating the silk and grains of cut green corn, comprising a plurality of endless traveling ropes arranged in groups in different horizontal planes, the ropes of each group being offset or staggered relatively to those of the adjacent groups, means for imparting a continuous movement to said ropes, and means for discharging the silk and corn vertically downward upon said ropes, substantially as described.

3. An apparatus for separating the silk and grains of cut green corn, comprising a frame, a vibrating screen mounted thereon, a plurality of shafts mounted one above another at each end of the frame below the screen, each shaft being provided with a plurality of wheels or pulleys, the pulleys of each shaft being offset or staggered relatively to those above and below, endless ropes passing around said pulleys from one end of the machine to the other and traveling across the space below the screen so as to substantially fill the same, and means for actuating said screen and shafts, substantially as described.

In testimony whereof I affix my signature in presence of two witnesses.

ELI HOUSTON.

Witnesses:
GEO. C. SMITH,
JOE E. MOON.